(12) United States Patent
Hostetter et al.

(10) Patent No.: US 8,113,484 B2
(45) Date of Patent: Feb. 14, 2012

(54) HIGH TEMPERATURE BALL VALVE SEAL

(75) Inventors: Steven Keith Hostetter, Colfax, IA (US); Lisa Marie Miller, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 538 days.

(21) Appl. No.: 11/850,981

(22) Filed: Sep. 6, 2007

(65) Prior Publication Data

US 2009/0065726 A1   Mar. 12, 2009

(51) Int. Cl.
*F16K 25/00* (2006.01)

(52) U.S. Cl. .................. 251/180; 251/174; 251/314

(58) Field of Classification Search .................. 251/170, 251/174, 176, 180, 315.01, 314
See application file for complete search history.

(56) References Cited

U.S. PATENT DOCUMENTS

| | | | | |
|---|---|---|---|---|
| 4,286,614 A * | 9/1981 | Kacal et al. | | 137/72 |
| 4,592,558 A * | 6/1986 | Hopkins | | 277/572 |
| 4,658,847 A * | 4/1987 | McCrone | | 137/72 |
| 5,163,692 A * | 11/1992 | Schofield et al. | | 277/436 |
| 5,655,752 A * | 8/1997 | De Villepoix et al. | | 251/359 |
| 5,799,953 A * | 9/1998 | Henderson | | 277/554 |
| 6,974,121 B2 * | 12/2005 | Koester et al. | | 251/174 |
| 6,997,211 B2 * | 2/2006 | Alman et al. | | 137/625.33 |
| 7,111,821 B2 * | 9/2006 | Promper | | 251/214 |
| 7,565,913 B2 * | 7/2009 | Pozzati | | 137/375 |
| 2003/0178595 A1 | 9/2003 | Koester et al. | | |
| 2005/0211942 A1 | 9/2005 | Koester et al. | | |

FOREIGN PATENT DOCUMENTS

CN 1643279 A 7/2005
WO WO-2006/093570 9/2006

OTHER PUBLICATIONS

International Search Report for PCT/US2008/074112, dated Nov. 26, 2008.
Office Action for Chinese Patent Application No. 200880105793.6, dated Mar. 14, 2011.

* cited by examiner

*Primary Examiner* — John Fristoe, Jr.
(74) *Attorney, Agent, or Firm* — Marshall, Gerstein & Borun LLP

(57) ABSTRACT

A high temperature ball valve seal is disclosed that achieves Class IV shutoff for operating temperatures above 550 degrees F. The ball valve seal includes a C-seal positioned between a main seal and a seal housing to prevent fluid from flowing through a secondary flowpath when the ball valve is in a closed position.

18 Claims, 3 Drawing Sheets

HIGH TEMPERATURE BALL VALVE SEAL

FIELD OF THE INVENTION

The disclosure relates to fluid valves and, more particularly, to high-temperature ball-type fluid valves.

BACKGROUND OF THE DISCLOSURE

Ball valves are used in a wide number of process control system applications to control some parameter of a process fluid (this may be a liquid, gas, slurry, etc.). While the process control system may use a control valve to ultimately control the pressure, level, pH or other desired parameter of a fluid, the control valve basically controls the rate of fluid flow.

Typically, a ball valve may include a fluid inlet and a fluid outlet separated by a ball element which, by rotating about a fixed axis and abutting a seal assembly, controls the amount of fluid flow therethrough. During operation, the process control system, or an operator controlling the control valve manually, rotates the ball element against, or away from a surface of the seal assembly, thereby exposing a flow passage, to provide a desired fluid flow through the inlet and outlet and, therefore, the ball valve.

Ball valve components, including the ball element and the seal assembly, are typically constructed of metal; this stands especially true when used in high pressure and/or high temperature applications. However, the ball element and seal assembly suffer wear due to the repeated extensive engagement of the ball element and seal assembly during opening and closing of the valve. The problems resulting from the wear include, but are not limited to, diminished life span of the valve components, increased frictional forces between the ball element and the seal assembly, and undesirable leakage between the ball element and the seal assembly. Similarly, because the frictional forces tend to increase as the components become more worn, the dynamic performance and control characteristics within the valve are worsened, resulting in inefficiencies and inaccuracies in the valve.

In the past attempts have been made to incorporate a biased main seal into the seal assembly to correct the above mentioned problems. Some heavy duty designs have incorporated to a Teflon® radial seal to enhance sealing performance under high-temperature operations. Ball valves having Teflon® radial seals are able to achieve Class IV shutoffs up to operating temperatures of approximately 550 deg F. Above 550 deg. F, a graphite piston ring is currently used because Teflon® deteriorates above approximately 550 deg. F. Graphite piston rings, while able to withstand higher temperatures, are only capable of achieving Class III shutoffs. As a result, ball valves having a Class IV shutoff capability above approximately 550 deg. F are not currently available.

Therefore, there remains a need for a high-temperature ball valve having a Class IV shutoff capability for systems operating above approximately 550 deg. F.

SUMMARY OF THE DISCLOSURE

In accordance with one aspect of the disclosure, a ball valve is provided having a fluid inlet and a fluid outlet. A seal element includes a biased main seal and a C-seal disposed between the main seal and a seal housing, enabling the ball valve to achieve Class IV shutoff capability at high-temperatures.

In accordance with another aspect of the disclosure, a method of operation for a ball valve, having an inlet and an outlet, is provided. The method includes, orienting a C-seal between a seal housing and a main seal to achieve Class IV shutoff capability at high operating temperatures.

Figure 1:
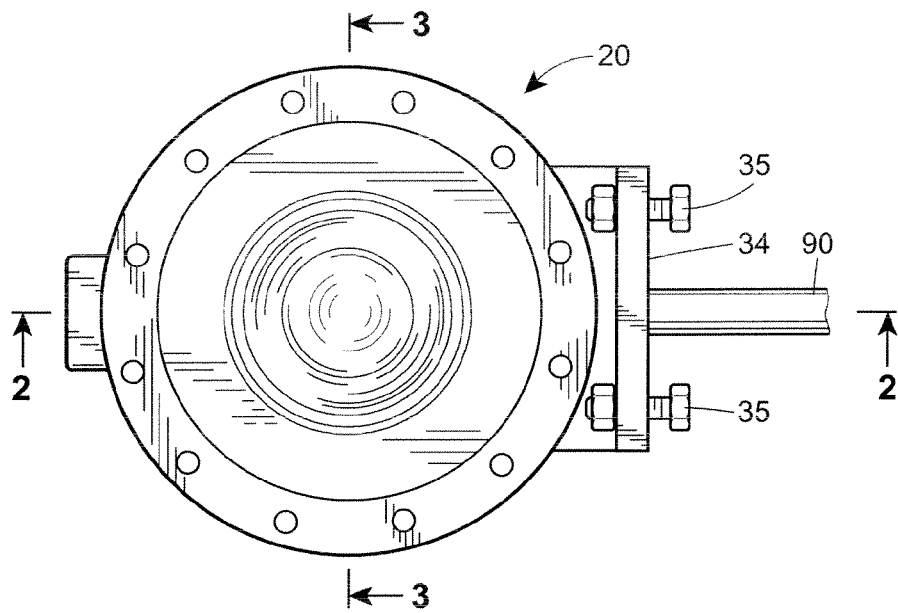
FIG. 1 is a top view of a ball valve constructed in accordance with the teachings of the disclosure.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the disclosure as defined by the appended claims.

DETAILED DESCRIPTION

Figure 2:
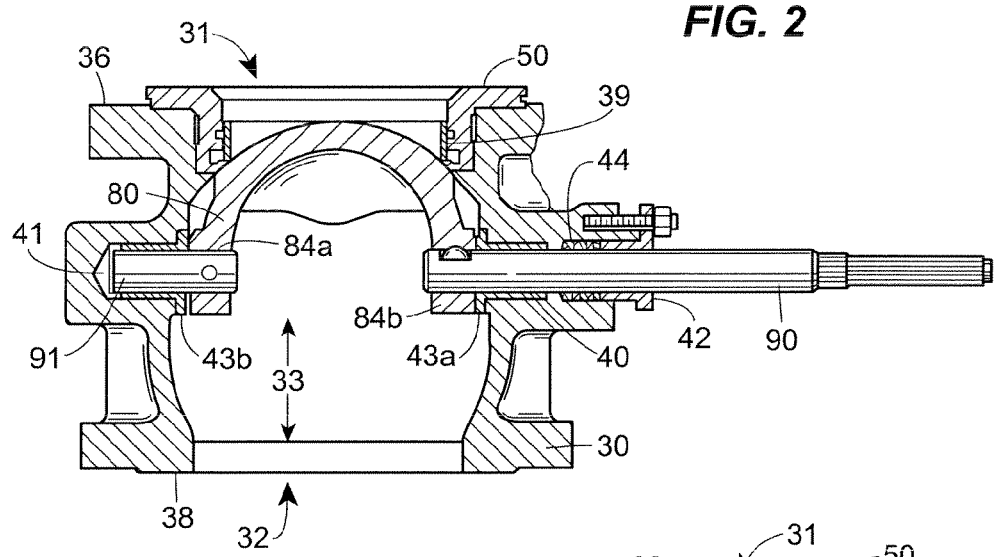
FIG. 2 is a cross-sectional view of the ball valve of FIG. 1, taken along line 2-2 of FIG. 1.
Figure 3:
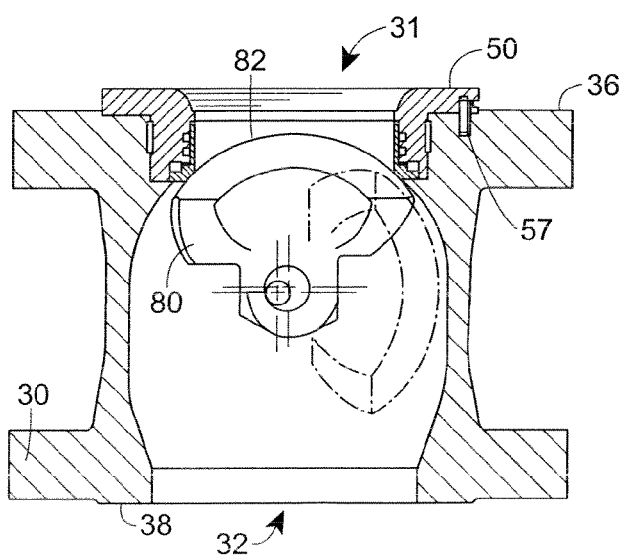
FIG. 3 is a cross-sectional view of the ball valve of FIG. 1, taken along line 3-3 of FIG. 1, and with the location of the ball element when the valve is in the open position being shown in phantom.

Referring now to the drawings, and with specific reference to FIGS. 1-3, a ball valve constructed in accordance with the teachings of the disclosure is generally depicted by reference numeral 20. As shown therein, the ball valve 20 includes a housing 30 having a primary flowpath 33 between an inlet 31 and an outlet 32, a seal assembly 50 attached to the housing 30 and a ball element 80 mounted on rotatable shafts 90 and 91 is disposed within the housing 30.

The housing 30, having a generally cylindrical shape, defines the primary flowpath 33 for a fluid traveling therethrough. At the bottom of the housing 30, as oriented in FIG. 2, is the outlet 32, of the primary flowpath 33, the outlet 32 being surrounded by an outlet flange 38. In a middle portion of the housing 30, a thru hole 40 penetrates the right wall of the housing 30, and a blind hole 41 opens to the interior of the housing 30, both holes 40 and 41 being concentric to each other and adapted to receive the shafts 90 and 91, respectively. Disposed between the drive shaft 90 and the outer right wall or "drive end" of the housing 30, is a packing follower 42, a set of packing rings 44, and a bearing 43a. Located on the drive end of housing 30, and engaging with fasteners 35, is an actuator mounting flange 34. Now turning to the top of the housing 30, still as oriented in FIG. 2, is a counterbore 39, creating the inlet 31 of the primary flowpath 33 and, receiving the seal assembly 50. Surrounding the inlet 31 is an inlet flange 36, the inlet flange 36 fastens the valve 20 to an incoming pipe (not shown). It should be noted at this point, that the inlet flange 36 and the outlet flange 38 may be wholly or partially removed, and that the connections between the inlet 31 and the outlet 32 may be made in various ways.

Figure 4:
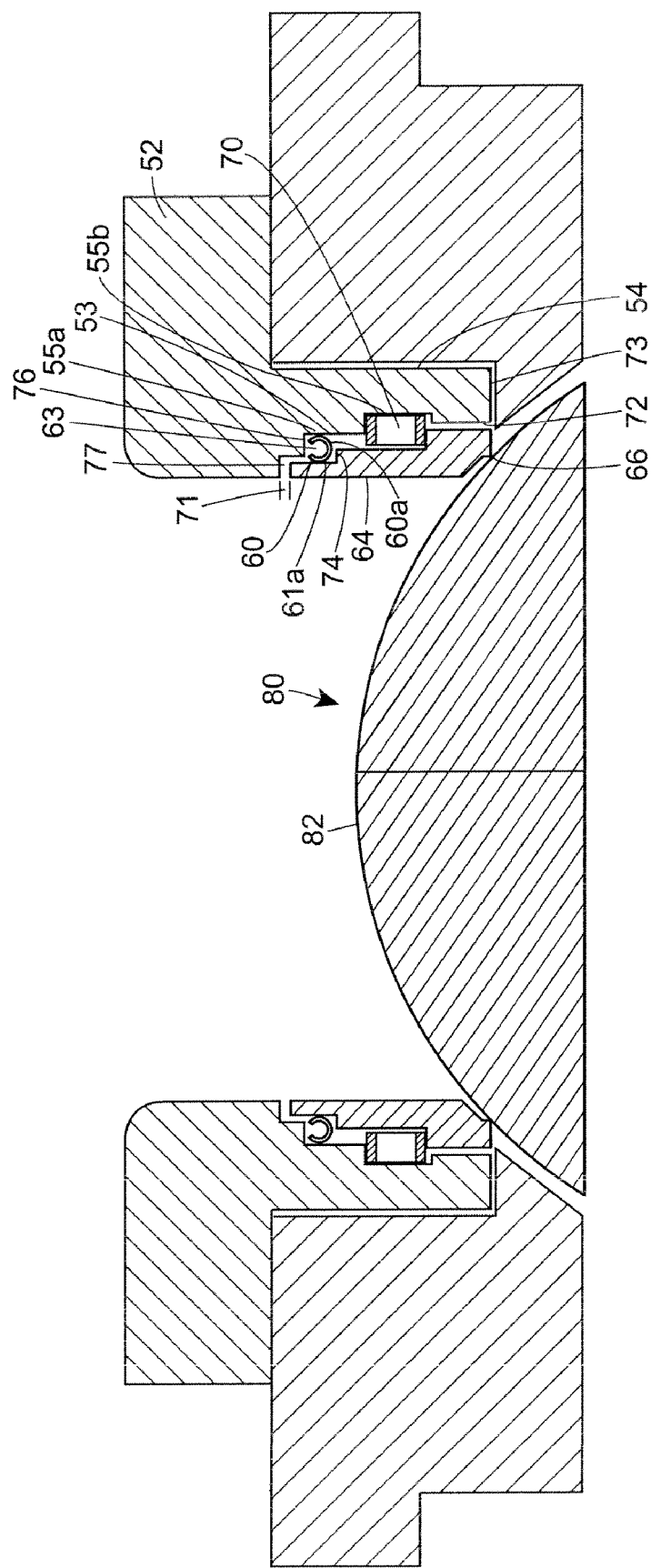
FIG. 4 is an enlarged, fragmentary sectional view of a portion of FIG. 3, depicting the ball valve in the closed position, including a main seal, a C-seal, a spring member and a seal housing.
Figure 4A:
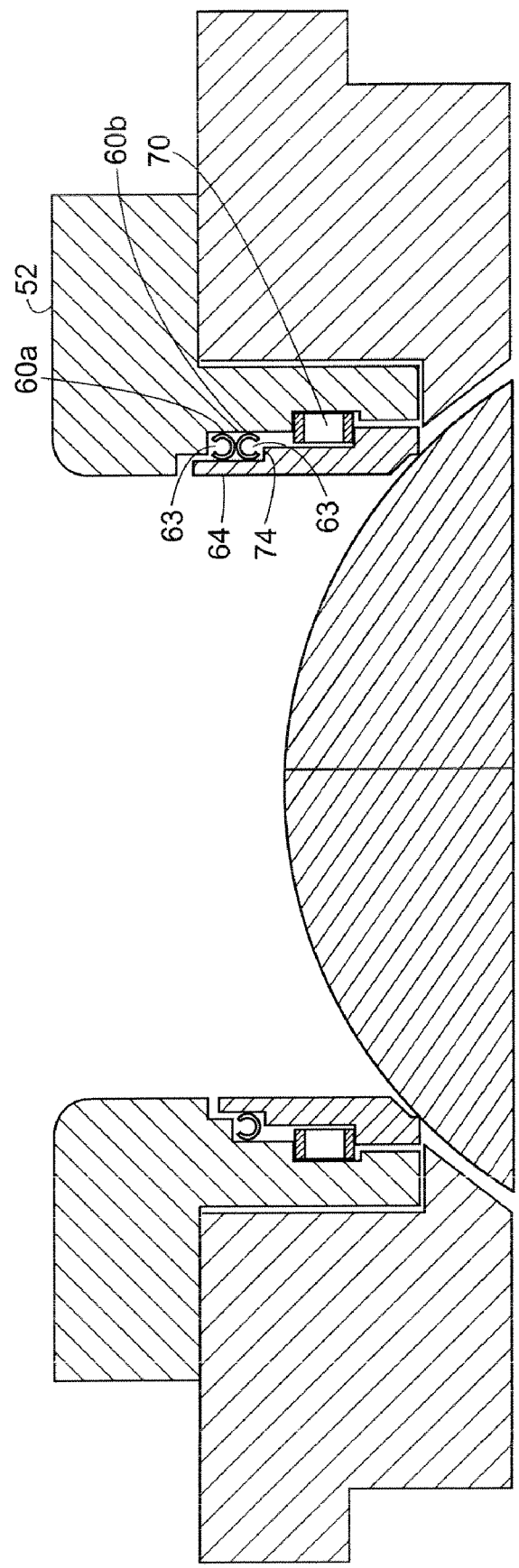
FIG. 4A is a enlarged, fragmentary sectional view of a portion of FIG. 3, depicting the ball valve in the closed position including a main seal, two C-seals, a spring member and a seal housing.

The seal assembly 50, as shown best in FIGS. 4-4A, includes a first sealing body, preferably a main seal 64, and a second sealing body, preferably a seal housing 52. As mentioned above, the seal assembly 50 is disposed within the counterbore 39 of the housing 30, and more specifically, an exterior surface 54 of the seal housing 52 is fixedly attached within the counterbore 39. On an interior surface 53 of the seal housing 52, is a pair of annular shoulders 55a & 55b which receive a C-seal 60 and a resilient member, such as a wave spring 70, respectively. The C-seal 60 and the resilient member 70 connect the main seal 64 to the seal housing 52. The resilient member 70 is disposed between the main seal 64 and the seal housing 52, creating a bias on the main seal 64 toward the ball element 80, by the addition of which a secondary flowpath 77 between the main seal 64 and the seal housing 52 is created. The C-seal creates a flow restriction of the fluid through the secondary flowpath 77. The C-seal is trapped between an annular shoulder 74 on the main seal and an annular shelf 76 on the seal housing 52. An opening of the C-seal 63 faces away from the ball 80 and toward the incoming fluid.

Abutting the main seal 64, when the valve 20 is in the closed position, is the ball element 80 (FIG. 4). The ball element 80 includes a spherical surface 82 that engages the main seal 64 when the valve is in the closed position. Attached to the ball element 80, through thru holes 84a & 84b are the follower shaft 91 and the drive shaft 90, respectively.

As mentioned previously, aiding the shafts 90 and 91 in alignment and rotation, are bearings 43a & 43b, disposed between the housing 30 and the shafts 90 and 91, respectively. Once again, as oriented in FIG. 2, the follower shaft 91 is disposed in the blind hole 41 of the follower end of housing 30. Engaging the follower shaft 91 and disposed between the follower end of housing 30 and the ball element 80 is the bearing 43b, and disposed between the drive end of the housing 30 and the ball element 80 is the bearing 43a. The drive shaft 90 then penetrates through the drive end of housing 30 via the thru hole 40, and engages the packing rings 44 and the packing follower 42 before protruding outside of the housing 30. At a outside end 92 of the shaft 90, the shaft 90 may be adapted to engage with an opening and closing mechanism.

In FIG. 4, the ball element 80 is rotated to abut the main seal 64, thereby creating a flow restriction of the primary flowpath 33 at a contact point 66. Preferably, as shown in FIG. 4, when the ball element 80 presses against the main seal 64, the main seal 64 may be displaced into the seal housing 52 by compressing the resilient member 70. To ensure proper movement and operation of the main seal 64, relative to the ball element 80 and the seal housing 52, a predetermined or calculated gap 71 created between the main seal 64 and the seal housing 52 may be carefully set. The gap 71 may be carefully set to ensure that the main seal 64 contacts the ball element 80, when the valve 20 is in the closed position. Working in combination with the gap 71 to ensure proper movement and operation of the valve 20, is a gap 73 created between the main seal 64 and the housing 30. The gap 73 ensures that the main seal 64 comes into direct contact with the housing 30, at the proper time, when the valve 20 is opening and closing. For example, if the gap 73 were too large, the main seal 64 may stay in contact with the ball element for an extended period of time during opening and closing of the valve 20, thereby resulting in an unwanted and avoidable amount of friction and wear between the main seal 64 and ball element 80. Similarly, if the gap 73 were too small the main seal 64 may contact the housing during the opening and closing of the valve 20 too soon, effectively preventing the main seal 64 from contacting the ball element 80, thereby creating a leak in the valve 20.

As the ball element 80 rotates toward the closed position, the ball element 80 contacts the main seal 64, thereby causing the gap 71 to become smaller as the ball element 80 rotates further into the fully closed position.

Also shown in FIG. 4 is the secondary flowpath 77, created between the main seal 64 and the seal housing 52 for accommodation of the resilient member 70. To prevent seepage through the secondary flowpath 77, preferably a C-seal is disposed between the main seal 64 and the seal housing 52, and more specifically is disposed between the annular shoulder 55a on the inner surface 53 of the seal housing 52 and the main seal 64. The C-seal 60 has an opening 63 that receives fluid through the secondary flow path 77 and thereby biases ends of the C-seal outward to seal the secondary flowpath 77. Multiple C-seals 60a and 60b may also be positioned in series to prevent the flow of fluid through the secondary flowpath 77 when the valve 20 is pressurized from either the inlet or the outlet (FIG. 4A). It should be realized, however, that two C-seals placed in series, is one of many ways to restrict the flow of fluid through the secondary flowpath 77 bi-directionally. Among other solutions, for example, the C-seals could be placed in parallel. Furthermore, because the C-seal 60 is disposed between the seal housing 52 and the main seal 64, the main seal 64 is enabled to properly align with the ball element 80. The C-seal 60 is elastic and is able to expand and contract.

The C-seal 60 also aids in the alignment of the ball element 80 to the main seal 64. This is accomplished during the closing of the valve 20, when the ball element 80 contacts the main seal 64 at the contact point 66. The ball element 80, at that time, places forces on the main seal 64 and attempts to displace the main seal 64 relative to the inner surface 53 of the seal housing 52. The C-seal 60 allows the main seal 64 to be displaced axially and radially, allthewhile keeping the ball element 80 and main seal 64 aligned thereby creating a flow restriction of the primary flowpath 33.

When the ball valve 20 is in the closed position, high pressure forces are created at the inlet 31. The increase of pressure may force the process fluid to bypass the primary flowpath restriction and be forced through the secondary flowpath 77. Preventing the fluid from penetrating through the secondary flowpath 77 is the C-seal 60, positioned such that the opening 63 faces toward the incoming fluid. Similarly, the increase of pressure may begin to deform or flex shafts 90 and 91 toward the direction of flow. As shafts 90 and 91 flex, the ball element 80 may begin to be displaced in a normal direction relative to the seal assembly 50. Preventing a leak between the displaced ball element 80 and the main seal 64, is the resilient member 70, by biasing the main 64 seal toward the ball element 80 as the ball element 80 is displaced. As the pressure increases, the shaft 90 and 91 may further flex, thereby further increasing the displacement of the ball element 80. The main seal 64 will continue to be biased against the ball element 80, until the main seal 64 is stopped, or the resilient member 70 is fully decompressed. As noted earlier, however, the high pressure may be created at the outlet 32, depending on the direction of the fluid flow through the primary flowpath 33. If the primary flowpath 33 would be reversed, the fluid would penetrate from the other side of the secondary flowpath 77, around the resilient member 70, and be restricted from further penetration by the C-seal 60b (FIG. 4A), also positioned such that the openings are facing toward incoming fluid. Similarly, the high pressure fluid may deform or flex the shafts 90 and 91, thereby displacing the ball element 80 toward the seal assembly and main seal 64. Preventing the leak of fluid between the ball element 80 and the main seal 64, once again, may be the resilient member 70 by biasing the ball element 80 against the main seal 64. As the pressure increases, thereby further flexing the ball element 80 toward the seal assembly 50, the main seal 64 may eventually bottom out on the seal housing 52, thereby substantially eliminating the gap 71.

The C-seal may be formed from any temperature resistant, flexible material such as, N07718.

The foregoing detailed description has been given for clearness of understanding only and no unnecessary limitations should be understood therefrom, as modifications will be obvious to those skilled in the art.

The invention claimed is:

1. A ball valve, comprising:
    a valve housing having an inlet and an outlet in fluid communication with a bore, the bore extending through the valve housing and defining a primary flowpath;
    a ball element mounted in the valve housing and movable between a closed position disconnecting the inlet from the outlet, to an open position connecting the inlet and outlet; and
    a seal assembly disposed within the valve housing, the seal assembly comprising a biased main seal and a seal housing, a secondary flowpath being formed between the seal housing and the biased main seal, the biased main seal being disposed within the primary flowpath and adapted to engage the ball element during the opening and closing of the valve, the seal assembly further comprising a C-seal disposed between the biased main seal and the seal housing, the C-seal being located between an annular shoulder formed on the main seal and an annular shelf formed on the seal housing, a bottom of the C-seal being located directly adjacent to the annular shoulder, the C-seal impeding fluid flow through the secondary flowpath,
    wherein the C-seal is formed from a single, temperature resistant and flexible material.

2. The valve of claim 1, wherein the temperature of a fluid passing through the valve is greater than approximately 550 degrees F.

3. The valve of claim 1, wherein the temperature resistant and flexible material is N07718.

4. The valve of claim 1, comprising another C-seal disposed in the secondary flowpath.

5. The valve of claim 4, wherein the two C-seals are oriented in series.

6. The valve of claim 4, wherein openings of the two C-seals are oriented away from one another.

7. The valve of claim 6, wherein one opening is oriented towards the inlet and the other opening is oriented towards the outlet.

8. The valve of claim 6, wherein the two C-seals are integrally formed.

9. The valve of claim 1, wherein the C-seal aligns the main seal with the ball element.

10. The valve of claim 1, wherein the main seal is biased by a resilient member into engagement with the ball when in the closed position.

11. The valve of claim 10, wherein the resilient member is a wave spring.

12. The valve of claim 10, wherein the resilient member is separated from the C-seal solely by a flat surface formed in the interior surface of the seal housing.

13. The valve of claim 1, wherein the C-seal has a maximum leakage of less than or equal to 0.01% of a rated capacity of the valve at operating temperatures above 550 degrees F.

14. A method of manufacturing a ball valve, comprising:
    providing a valve body having an inlet and an outlet forming a primary flowpath;
    mounting a ball element relative the valve body, between the inlet and the outlet; and
    biasing a seal assembly, the seal assembly including a main seal, a seal housing, and a C-seal, such that the main seal engages the ball element to impede fluid flow through the primary flowpath during the opening and closing of the valve and the C-seal impedes fluid flow through a secondary flowpath, the C-seal being located between an annular shoulder formed on the main seal and an annular shelf formed on the seal housing, a bottom of the C-seal being located directly adjacent to the annular shoulder,
    wherein the C-seal is formed from a single, temperature resistant and flexible material.

15. The method of claim 14, wherein a fluid passing through the valve body has an operating temperature above approximately 550 degrees F.

16. The method of claim 14, further comprising providing another C-seal in the secondary flowpath.

17. The method of claim 14, wherein temperature resistant and flexible material is N07718.

18. The method of claim 14 wherein the C-seal has a maximum leakage of less than or equal to 0.01% of a rated capacity of the valve at operating temperatures above 550 degrees F.

* * * * *

UNITED STATES PATENT AND TRADEMARK OFFICE
CERTIFICATE OF CORRECTION

| | |
|---|---|
| PATENT NO. | : 8,113,484 B2 |
| APPLICATION NO. | : 11/850981 |
| DATED | : February 14, 2012 |
| INVENTOR(S) | : Steven K. Hostetter et al. |

It is certified that error appears in the above-identified patent and that said Letters Patent is hereby corrected as shown below:

In the Specification:

At Column 3, line 36, "a outside" should be -- an outside --.

At Column 4, line 31, "allthewhile" should be -- all the while --.

Signed and Sealed this
Twenty-eighth Day of May, 2013

Teresa Stanek Rea
*Acting Director of the United States Patent and Trademark Office*